(12) United States Patent
Fukano et al.

(10) Patent No.: US 9,109,933 B2
(45) Date of Patent: Aug. 18, 2015

(54) ELECTROMAGNETIC FLOWMETER

(71) Applicant: SMC CORPORATION, Chiyoda-ku (JP)

(72) Inventors: Yoshihiro Fukano, Moriya (JP); Yuji Tsuda, Joso (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/211,794

(22) Filed: Mar. 14, 2014

(65) Prior Publication Data

US 2014/0298920 A1    Oct. 9, 2014

(30) Foreign Application Priority Data

Apr. 8, 2013   (JP) .................................. 2013-080264

(51) Int. Cl.
   *G01F 1/58*    (2006.01)
   *G01F 15/14*   (2006.01)
   *G01F 15/18*   (2006.01)

(52) U.S. Cl.
   CPC ................ *G01F 1/588* (2013.01); *G01F 15/14* (2013.01); *G01F 15/18* (2013.01)

(58) Field of Classification Search
   CPC ........................................................ G01F 1/58
   USPC ......................................... 73/861.12, 861.11
   See application file for complete search history.

(56) References Cited

U.S. PATENT DOCUMENTS

| 4,641,537 | A | * | 2/1987 | Hansen et al. | ............. 73/861.12 |
| 5,003,517 | A | * | 3/1991 | Greer, Jr. | ...................... 367/178 |
| 5,503,026 | A | * | 4/1996 | Bohm et al. | ............... 73/861.11 |

FOREIGN PATENT DOCUMENTS

| JP | 2001-241981 | 9/2001 |
| JP | 2009-258003 | 11/2009 |
| JP | 4591015 | 12/2010 |
| JP | 5102463 | 12/2012 |

OTHER PUBLICATIONS

Office Action issued Jun. 2, 2015 in Japanese Patent Application No. 2013-080264 (with partial English translation).

* cited by examiner

*Primary Examiner* — Jewel V Thompson
(74) *Attorney, Agent, or Firm* — Oblon, McClelland, Maier & Neustadt, L.L.P.

(57) ABSTRACT

An electromagnetic flowmeter includes a yoke of a solenoid unit, which is accommodated in the interior of a body. The yoke is U-shaped in cross section, with a pipe unit including a measurement conduit being arranged in the interior of the yoke. One end portion and another end portion of the measurement conduit are formed with true circular shapes in cross section, whereas an intermediate portion thereof between the one end portion and the other end portion is formed with an oval shape in cross section. On the measurement conduit, cross-sectional straight line portions thereof, which are formed in the intermediate portion, are arranged in a vertical direction. Coils of the solenoid unit and excitation plates are arranged in facing relation to the cross-sectional straight line portions.

6 Claims, 4 Drawing Sheets

ELECTROMAGNETIC FLOWMETER

CROSS-REFERENCE TO RELATED APPLICATION

This application is based upon and claims the benefit of priority from Japanese Patent Application No. 2013-080264 filed on Apr. 8, 2013, the contents of which are incorporated herein by reference.

BACKGROUND OF THE INVENTION

1. Field of the Invention

The present invention relates to an electromagnetic flowmeter which is capable of measuring the flow rate of a fluid that flows in the interior of a flow passage.

2. Description of the Related Art

Heretofore, for example, an electromagnetic flowmeter has been known in which, by energizing coils, a magnetic field is formed in a flow passage through which a fluid flows, and the flow rate of the fluid is calculated based on an electromotive force generated in accordance with the conductivity of the fluid that flows through the flow passage.

Such a flowmeter, for example as disclosed in Japanese Patent No. 4591015 (Patent Document 1), is equipped with a measurement conduit through which the fluid is guided, a pair of electrodes mounted on an outer side of the measurement conduit, and a pair of excitation coils and a pair of cores, each pair being arranged perpendicularly with respect to the electrodes on the outer side of the measurement conduit. Additionally, a magnetic field generated by the excitation coils is formed perpendicularly with respect to the measurement conduit, and an electromotive force, which is generated in the fluid by the pair of electrodes, is extracted and converted by a controller into a flow rate of the fluid. Further, in such an electromagnetic flowmeter, a flow passage formed in the interior of the measurement conduit is formed such that an inlet port and an outlet port in an axial direction thereof are formed with circular shapes in cross section, and an intermediate region in the axial direction is formed with an elliptical shape in cross section. The two excitation coils are thereby arranged in close proximity at the intermediate region with a gap between the excitation coils being kept small, so that magnetic losses are minimized, and thus a large signal can be obtained with low power.

Further, with the electromagnetic flowmeter disclosed in Japanese Patent No. 5102463 (Patent Document 2), a yoke lid is fastened to an upper part of an excitation plate on which excitation coils are mounted, an outer peripheral region of a measurement conduit is thereby surrounded by a metallic member, and a magnetic circuit is constructed by a magnetic field generated by the excitation coils.

SUMMARY OF THE INVENTION

However, in the electromagnetic flowmeter according to the aforementioned Patent Document 1, in the flow passage in the interior of the measurement conduit, the one end portion and the other end portion that make up the inlet port and the outlet port are formed with circular shapes in cross section, and the flow passage is formed with a uniform cross-sectional area from the one end portion to the other end portion encompassing the intermediate region therebetween. As a result, concerning the intermediate region, which is formed with an elliptical shape in cross section, the major axis (elongated portion) thereof is greater than the outside diameter of the one end portion and the other end portion, which are formed with circular shapes in cross section, accompanied by the measurement conduit being expanded in diameter, thereby leading to an increase in size of the electromagnetic flowmeter.

Further, with the electromagnetic flowmeter, a lining is disposed on the inner circumferential surface of the cross-sectional circular shaped measurement conduit, and by changing the shape of the lining, the flow passage of the intermediate region is made into an elliptical shape in cross section. However, for example, when the lining is formed by adhesion of a resin material to the inner circumferential surface of the measurement conduit, creation of the cross-sectional elliptical shape is complicated, and it is difficult to manufacture the measurement conduit with high precision to have a desired flow passage cross-sectional area.

On the other hand, with the electromagnetic flowmeter according to Patent Document 2, since a structure is provided in which the outer circumferential side of the measurement conduit is surrounded by the yoke lid and the excitation plate, the cost of components and the weight in relation to the yoke increase. Together therewith, due to the need for fastening the yoke lid to the excitation plate, the number of assembly steps increases, accompanied by a commensurate increase in manufacturing costs.

A general object of the present invention is to provide an electromagnetic flowmeter which enables a further reduction in size and weight thereof.

The present invention is characterized by an electromagnetic flowmeter including a body having an upstream side port and a downstream side port connected by a fluid passage, a measurement conduit disposed between the upstream side port and the downstream side port in the interior of the body, and a pair of coils and a pair of electrodes, each pair being arranged in confronting relation to each other on an outer circumferential side of the measurement conduit.

The measurement conduit is formed integrally from a resin material, one end portion and another end portion thereof along an axial direction, which are connected to the upstream side port and the downstream side port, are formed with true circular shapes in cross section, an intermediate portion thereof between the one end portion and the other end portion is formed with an oval shape in cross section, the coils are arranged in confronting relation to cross-sectional straight line portions formed on the outer circumferential surface of the intermediate portion, and the electrodes are arranged perpendicularly with respect to the coils.

According to the present invention, in the electromagnetic flowmeter in which the measurement conduit made from a resin material is disposed in the body, and pairs of coils and electrodes are arranged in confronting relation, respectively, on the outer circumferential side of the measurement conduit, one end portion and another end portion of the measurement conduit are connected respectively to the upstream side port and the downstream side port in the body. The one end portion and the other end portion are formed respectively with true circular shapes in cross section, whereas the intermediate portion between the one end portion and the other end portion is formed with an oval shape in cross section. In addition, on the measurement conduit, the coils are arranged in confronting relation to cross-sectional straight line portions formed on the outer circumferential surface of the intermediate portion, and the electrodes are arranged perpendicularly with respect to the coils. Consequently, since the pair of coils can be arranged in close proximity while sandwiching therebetween the intermediate portion of the measurement conduit that is formed with an oblong shape in cross section, magnetic losses are suppressed, and thus a large signal can be obtained with low power. In addition, an increase in size of the outside diameter of the measurement conduit, which would occur in the electromagnetic flowmeter of the conventional technique, is prevented. As a result, a reduction in size and weight of the electromagnetic flowmeter can be achieved.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
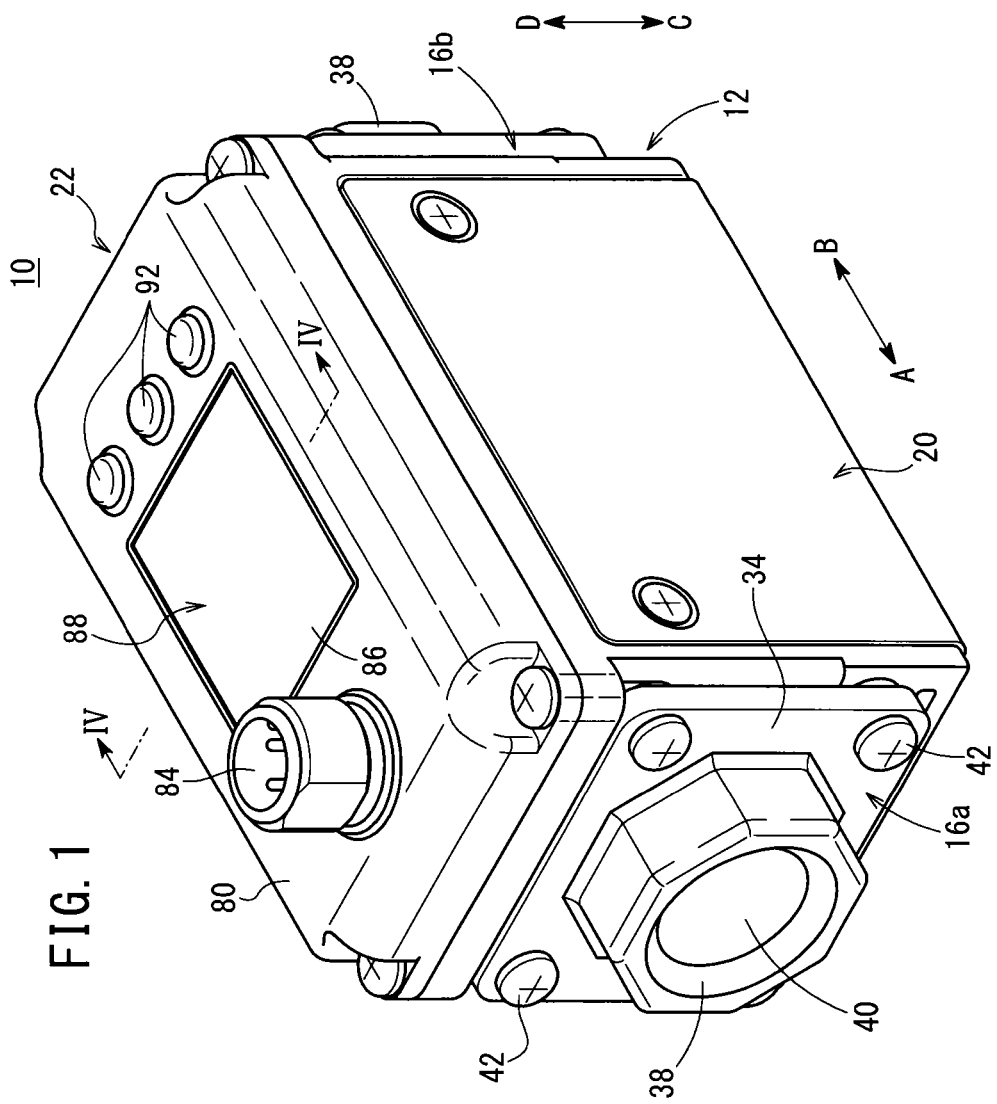
FIG. 1 is an exterior perspective view of an electromagnetic flowmeter according to an embodiment of the present invention.

As shown in FIGS. 1 through 4, an electromagnetic flowmeter 10 includes a body 12, a pipe unit 14 accommodated in the interior of the body 12, a pair of (ground potential) attachments 16a, 16b connected to opposite ends of the body 12 and the pipe unit 14, a solenoid unit 18 disposed on both sides of the pipe unit 14 in the interior of the body 12, a cover member 20 that covers side surfaces of the body 12, and a display unit 22 provided on an upper surface of the body 12.

The body 12 is formed, for example, from a metal material with a substantially rectangular shape in cross section, and is formed in a hollow shape having a space in the interior thereof. Installation holes 24, in which the attachments 16a, 16b are mounted, open respectively on opposite ends in the axial direction (the direction of arrows A and B) of the body 12. An opening 26, in which the display unit 22 is mounted, is provided on the upper surface of the body 12. The cover member 20, which is U-shaped in cross section, is mounted on the body 12 so as to cover both sides and the bottom of the body 12 (see FIG. 4).

Figure 3:
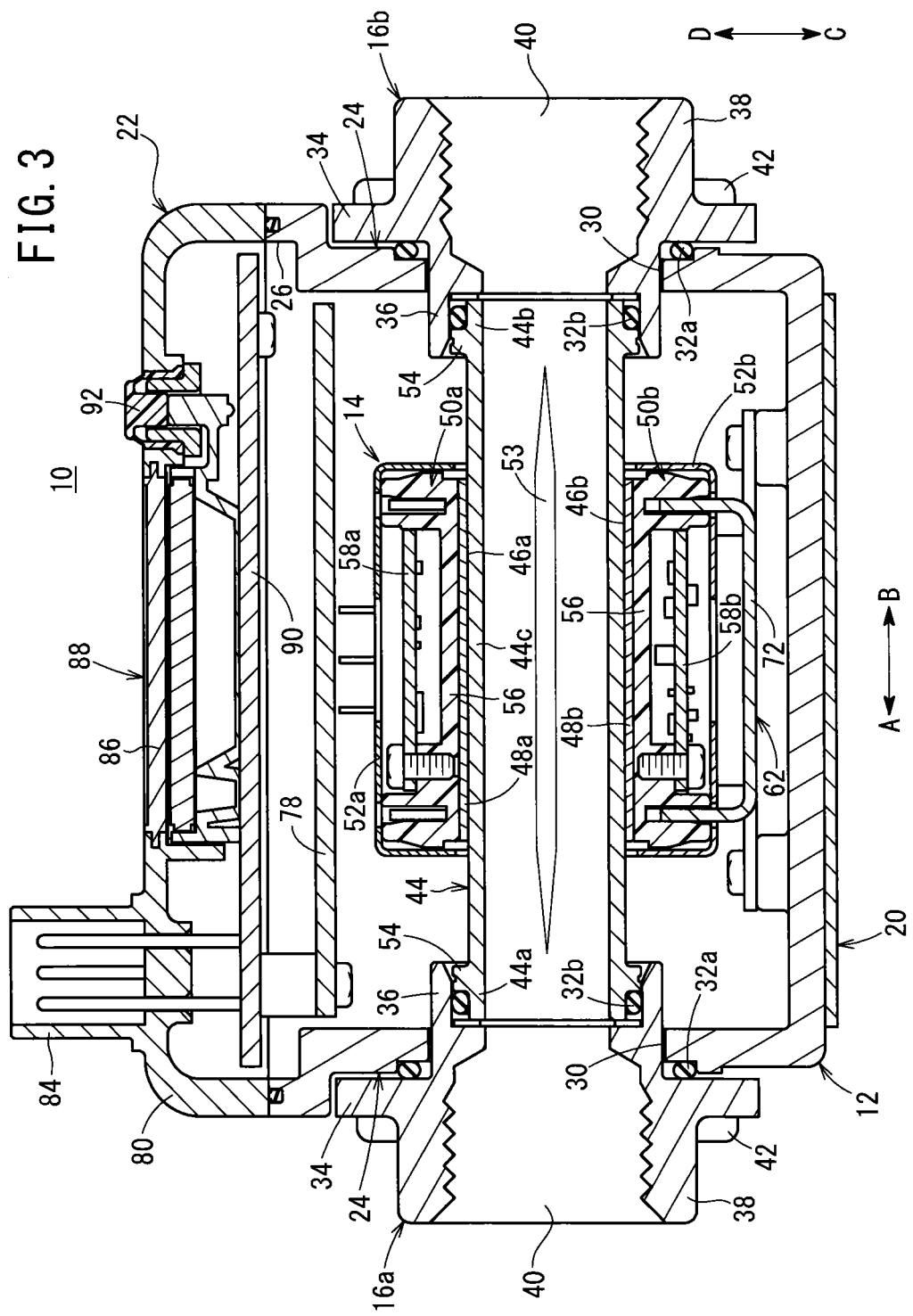
FIG. 3 is a vertical cross-sectional view of the electromagnetic flowmeter shown in FIG. 1.

As shown in FIG. 3, the installation holes 24 include attachment holes 30 that open substantially centrally therein. On open end portions of the attachment holes 30, o-rings 32a are mounted respectively via annular grooves on outer circumferential sides of the attachment holes 30.

The attachments 16a, 16b are constituted from base sections 34, which are formed in a rectangular shape, and first and second tubular portions 36, 38 disposed in the center of the base sections 34 and which project outwardly in the axial direction, respectively, from opposite side surfaces of the base sections 34. In addition, through holes (ports) 40 are formed along a straight line penetrating through the first and second tubular portions 36, 38 and the interior of the base sections 34. When the attachments 16a, 16b are installed on the body 12, the first tubular portions 36 are inserted in the attachment holes 30, and the base sections 34 are fastened to the body 12 by a plurality of attachment bolts 42. In this case, the second tubular portions 38 are arranged so as to project outwardly from opposite ends of the body 12. Non-illustrated tubes or the like, for example, are connected to the second tubular portions 38.

In this manner, the two attachments 16a, 16b are disposed in a mutually coaxial fashion sandwiching the body 12 therebetween.

The pipe unit 14 includes a tubular measurement conduit 44 having a predetermined length in the axial direction (the direction of arrows A and B), a pair of electrodes 46a, 46b adhered to side surfaces of the measurement conduit 44, a pair of foam sheets 48a, 48b that cover the electrodes 46a, 46b, a pair of circuit-board holders 50a, 50b disposed on outer sides of the foam sheets 48a, 48b and that retain circuit boards 58a, 58b therein, and a pair of shield covers 52a, 52b provided on outer circumferential sides of the circuit-board holders 50a, 50b and covering the circuit boards 58a, 58b.

The measurement conduit 44 is formed, for example, from a resin material having a predetermined length in the axial direction (the direction of arrows A and B). One end portion 44a and another end portion 44b of the measurement conduit 44 are formed with true circular shapes in cross section, and an intermediate portion 44c thereof between the one end portion 44a and the other end portion 44b is formed with an oval (oblong) shape in cross section. More specifically, the cross-sectional shape of the measurement conduit 44 changes gradually in the axial direction (in the direction of the arrow B) from the one end portion 44a so as to become oval-shaped in cross section, thereby forming the intermediate portion 44c, and further changes gradually from the intermediate portion 44c toward the other end portion 44b to again become perfectly circular in cross section.

Moreover, because the measurement conduit 44 is formed from a resin material, a lining, which would be provided in the electromagnetic flowmeter according to the conventional technique, is not disposed on the inner circumferential surface thereof.

Figure 4:
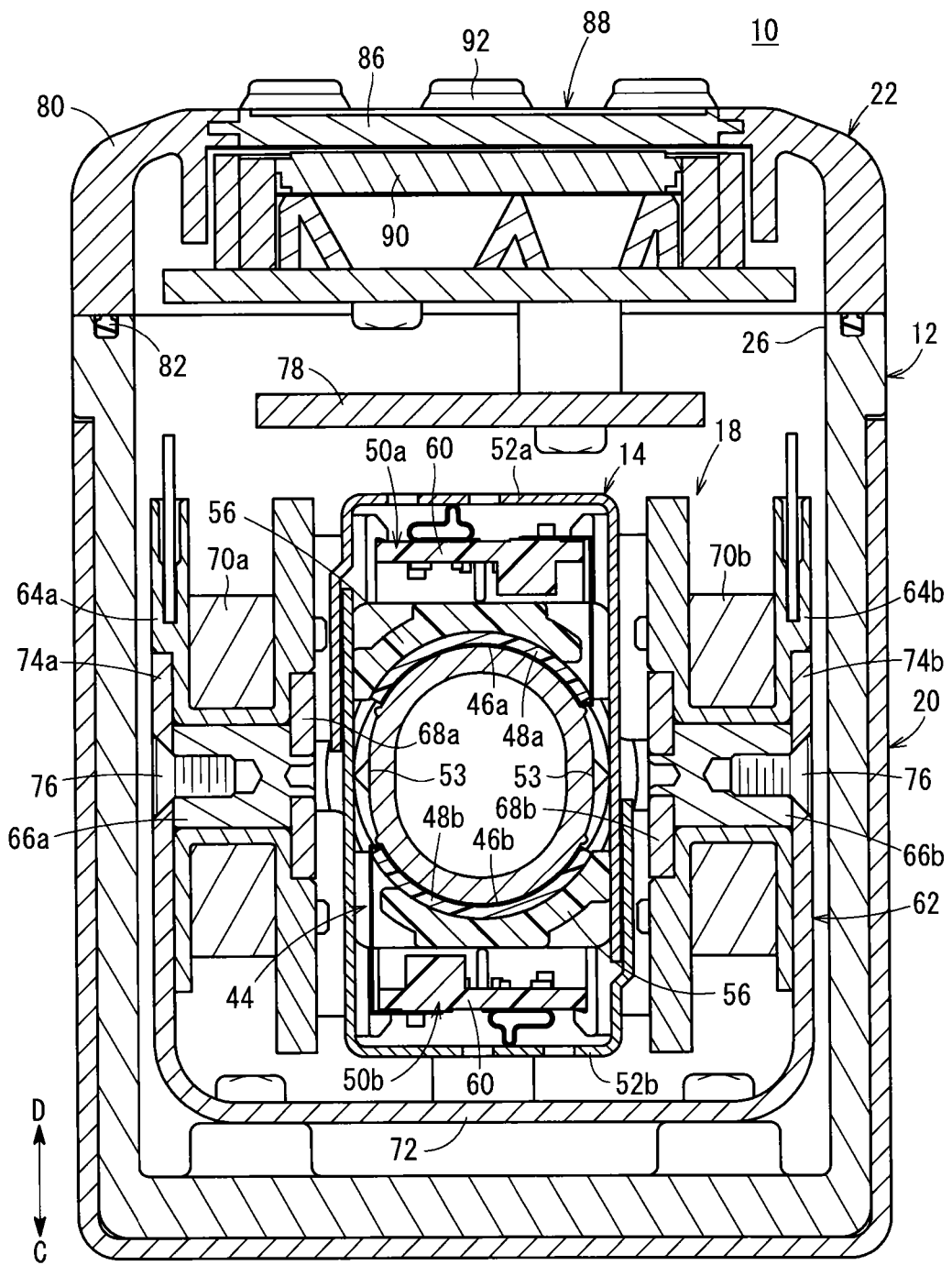
FIG. 4 is a cross-sectional view taken along line IV-IV of FIG. 1.

As shown in FIG. 4, the intermediate portion 44c is formed with an oval shape in cross section, which is elongated in a vertical direction (the direction of arrows C and D), and a pair of cross-sectional straight line portions 53, which are formed on opposite side portions of the oval shape, are arranged in confronting relation to coils 70a, 70b of the later-described solenoid unit 18. Stated otherwise, the measurement conduit 44 is disposed in the interior of the body 12 such that the major axis of the intermediate portion 44c, which is formed with an oblong shape in cross section, is oriented in the vertical direction (the direction of arrows C and D), whereas the minor axis is oriented in the horizontal direction.

Figure 2:
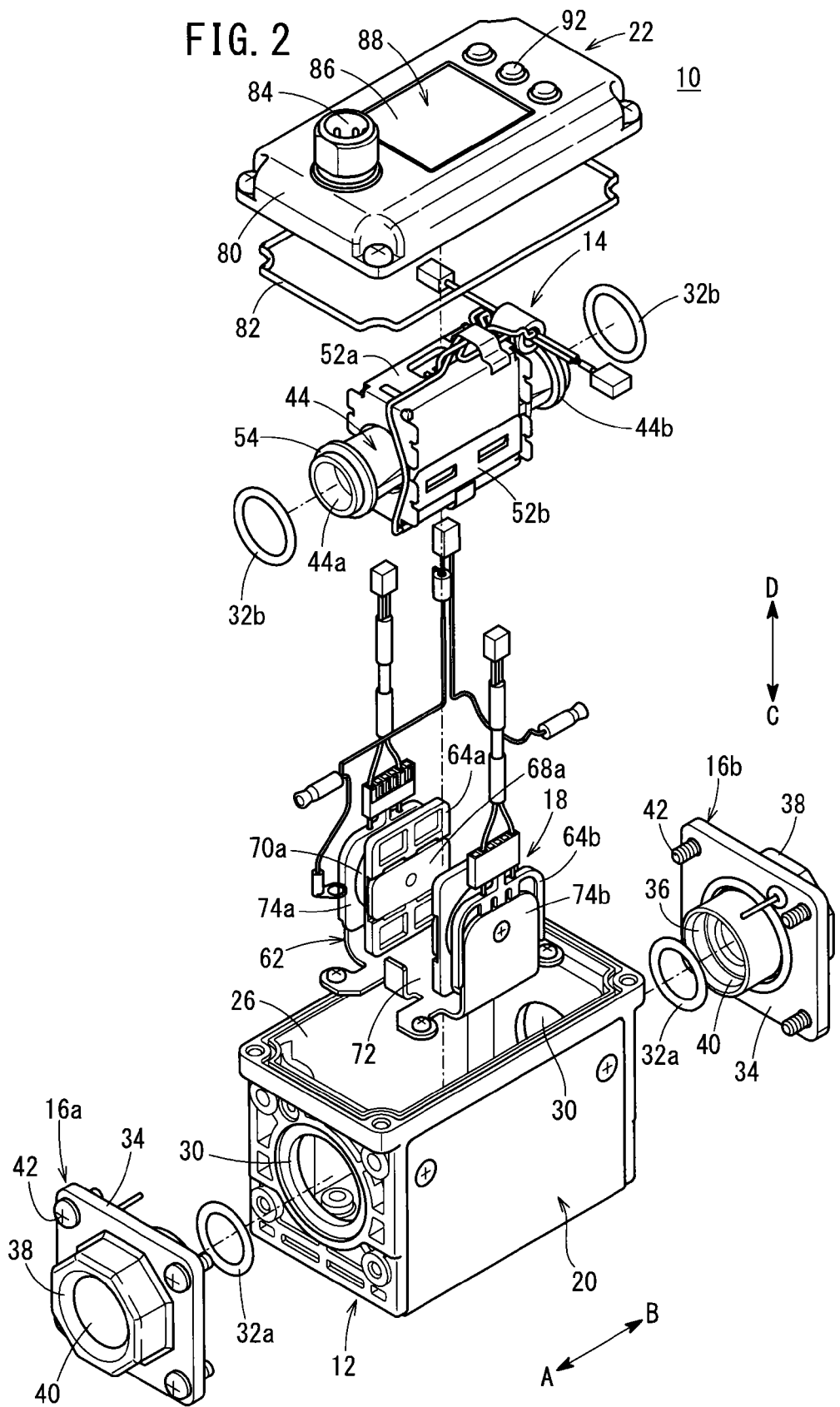
FIG. 2 is an exploded perspective view of the electromagnetic flowmeter shown in FIG. 1.

Further, as shown in FIGS. 2 and 3, on the one end portion 44a and the other end portion 44b of the measurement conduit 44, there are formed flanges 54 that project with ring-like shapes on outer circumferential surfaces thereof, and o-rings 32b are mounted respectively on the flanges 54.

As shown in FIGS. 3 and 4, the one and the other of the electrodes 46a, 46b are disposed at symmetrical positions centrally about the measurement conduit 44, and are fixed by adhesion to the outer circumferential surface of the measurement conduit 44 using an electrically-conductive adhesive, for example. Stated otherwise, the electrodes 46a, 46b are arranged on a straight line in a direction perpendicular with respect to the axis of the measurement conduit 44. The electrodes 46a, 46b are arc-shaped in cross section corresponding to the outer circumferential cross-sectional shape of the measurement conduit 44. The foam sheets 48a, 48b are mounted respectively on outer circumferential sides of the electrodes 46a, 46b, so as to completely cover the electrodes 46a, 46b.

As shown in FIG. 4, the circuit-board holders 50a, 50b, which are formed, for example, from a resin material, include main body portions 56 formed with arcuate shapes in cross section corresponding to the outer circumferential surface of the measurement conduit 44, and circuit-board-holding sections 60 formed on upper parts of the main body portions 56, which are capable of retaining the circuit boards 58a, 58b therein.

In addition, the circuit-board holders 50a, 50b are mounted through the main body portions 56 in covering relation to outer circumferential sides of the foam sheets 48a, 48b. Plate-shaped circuit boards 58a, 58b are mounted on the circuit-board-holding sections 60. The circuit boards 58a, 58b are connected electrically to the electrodes 46a, 46b.

The shield covers 52a, 52b are U-shaped in cross section and are formed, for example, from a metal material. One of the shield covers 52a is mounted from above in surrounding relation to the measurement conduit 44 and the circuit-board holder 50a, whereas the other of the shield covers 52b is mounted from below in surrounding relation to the measurement conduit 44 and the circuit-board holder 50b. Additionally, the open end of one of the shield covers 52a and the open end of the other of the shield covers 52b are fixed to one another mutually in an overlapping state. Consequently, the measurement conduit 44, the electrodes 46a, 46b, and the circuit-board holders 50a, 50b including the circuit boards 58a, 58b, are covered on outer peripheral sides thereof by the pair of shield covers 52a, 52b.

As shown in FIGS. 2 and 4, the solenoid unit 18 includes a yoke 62 provided on an outer circumferential side of the measurement conduit 44 of the pipe unit 14, a pair of bobbins 64a, 64b fixed to the yoke 62, a pair of excitation plates 68a, 68b fixed through iron cores 66a, 66b to central portions of the bobbins 64a, 64b, and coils 70a, 70b that are wound around the bobbins 64a, 64b.

The coils 70a, 70b, the bobbins 64a, 64b, and the excitation plates 68a, 68b are disposed on a straight line at symmetrical positions sandwiching the measurement conduit 44 therebetween.

The yoke 62 is formed into a substantially U-shape in cross section by press-forming a plate made, for example, from a metal material. The yoke 62 includes a planar portion 72, and a pair of orthogonal walls 74a, 74b, which are erected perpendicularly from opposite ends of the planar portion 72. More specifically, the orthogonal walls 74a, 74b are disposed substantially in parallel with each other.

In the yoke 62, the bobbins 64a, 64b around which the coils 70a, 70b are wound are fixed through bolts 76 to the orthogonal walls 74a, 74b. The iron cores 66a, 66b, which are securely attached beforehand to the excitation plates 68a, 68b by caulking (crimping), are inserted through centers of the bobbins 64a, 64b and are fixed by the bolts 76.

In addition, the yoke 62, on which the bobbins 64a, 64b and the excitation plates 68a, 68b, etc., are assembled in the foregoing manner, is fixed with respect to the bottom of the body 12, such that the planar portion 72 thereof is positioned downwardly (in the direction of the arrow C) and disposed horizontally, whereas the orthogonal walls 74a, 74b are disposed to extend upwardly (in the direction of the arrow D).

Further, an excitation detection circuit board 78 is disposed in facing relation to the opening 26 of the body 12. Current is supplied to the coils 70a, 70b in accordance with a current control from the excitation detection circuit board 78.

When the pipe unit 14 is arranged in the interior of the yoke 62, the two cross-sectional straight line portions 53 of the measurement conduit 44 are disposed respectively in confronting relation to the coils 70a, 70b and the excitation plates 68a, 68b. Owing thereto, for example, compared to arranging the pair of coils 70a, 70b on the outer circumferential side of a measurement conduit that is formed with a true circular shape in cross section, by disposing the coils 70a, 70b at positions facing the cross-sectional straight line portions 53 in a region on the minor axis which is narrower in the cross-sectional oval shape, the coils 70a, 70b can be arranged in closer proximity to each other.

As shown in FIGS. 1 through 4, the display unit 22 is disposed on an upper surface of the body 12 so as to close the opening 26. When the casing 80 of the display unit 22 is mounted on the upper surface of the body 12, by coming into contact with a waterproof seal 82, penetration of moisture from the outside into the interior of the display unit 22 is prevented.

As shown in FIGS. 1 through 3, on one end side (in the direction of the arrow A) of the casing 80, a connector 84 is provided to which a non-illustrated signal cable can be connected. By connection of the signal cable to the connector 84, detection results, which are detected by the electromagnetic flowmeter 10, can be output to the exterior as detection signals.

Further, in a center portion of the casing 80, a display section 88 is provided having a display 86 on which there is shown, for example, the flow rate of a fluid to be measured, which is measured by the electromagnetic flowmeter 10. On the other end side (in the direction of the arrow B) of the casing 80, there are provided a control board 90 that controls the display 86, etc., and buttons 92 that enable display switching operation and the like of the display section 88.

The electromagnetic flowmeter 10 according to the embodiment of the present invention is constructed basically as described above. Next, operations and advantageous effects thereof will be described.

On the electromagnetic flowmeter 10, non-illustrated tubes are connected to the pair of attachments 16a, 16b, and through such tubes, a fluid (liquid) to be measured is supplied from a non-illustrated measurement fluid supply source. In addition, the measurement fluid flows through one of the attachments 16a on the upstream side, flows into the interior of the measurement conduit 44 of the pipe unit 14, and then is guided out through the other attachment 16b disposed on the downstream side.

At this time, the coils 70a, 70b of the solenoid unit 18 are energized and excited, thereby generating a magnetic field in a direction perpendicular to the measurement conduit 44 which is disposed in confronting relation to the coils 70a, 70b. An electromotive force is detected by the pair of electrodes 46a, 46b, which are disposed in a direction perpendicular to the magnetic field, and the electromotive force is output to a controller (not shown) that calculates the flow rate of the measurement fluid. Consequently, the flow rate of the measurement fluid that flows through the interior of the electromagnetic flowmeter 10 is detected, and the detected flow rate is displayed on the display section 88 of the display unit 22.

In the foregoing manner, with the present embodiment, the measurement conduit 44 of the pipe unit 14 is formed integrally from a resin material, the one end portion 44a and the other end portion 44b thereof are formed with true circular shapes in cross section, and the intermediate portion 44c along the axial direction (the direction of arrows A and B) is formed with an oblong shape in cross section, whereby an increase in the outside diameter of the measurement conduit, which would occur in the electromagnetic flowmeter of the conventional technique, is prevented. As a result, compared with the conventional electromagnetic flowmeter, since the measurement conduit is not expanded in diameter, the electromagnetic flowmeter 10 can be made smaller in size. In addition, by arranging the pair of coils 70a, 70b in close proximity sandwiching the measurement conduit 44 therebetween, magnetic losses can be suppressed, and a large signal can be obtained with less power.

Further, by forming the measurement conduit 44 from a resin material, there is no need to provide a lining on the interior of the measurement conduit 44, while in addition, the one end portion 44a and the other end portion 44b, which are perfectly circular in cross section, and the intermediate portion 44c, which is oblong in cross section, can be formed together integrally in the measurement conduit 44. As a result, the measurement conduit 44 through which the measurement fluid flows can be formed with high precision to have a desired flow passage cross-sectional area.

Furthermore, due to being formed from a metal material with a U-shape in cross section, since the yoke 62 in which the coils 70a, 70b and the bobbins 64a, 64b are retained can be arranged in an upwardly open manner (open in the direction indicated by the arrow D), ease of assembly can be enhanced when the pipe unit 14 is assembled in the interior of the yoke 62. Additionally, compared to a case in which the pipe unit 14 is surrounded completely on its outer peripheral side by the yoke 62, since the number of component parts is reduced, a reduction in size and weight can be realized.

Still further, the cover member 20, which is made from a metal material, is electrically isolated from the attachments 16a, 16b, which are at ground potential. Therefore, compared to the electromagnetic flowmeter according to the conventional technique, in which the entirety of the body, etc., is surrounded by a cover member and is biased at ground potential, ease of assembly can be improved.

Although a preferred embodiment of the present invention has been presented above, the flowmeter according to the present invention is not limited to this embodiment, and various changes and modifications may be made thereto without departing from the scope of the invention as set forth in the appended claims.

What is claimed is:

1. An electromagnetic flowmeter including a body having an upstream side port and a downstream side port connected by a fluid passage, a measurement conduit disposed between the upstream side port and the downstream side port in an interior of the body, and a pair of coils and a pair of electrodes, each pair being arranged in confronting relation to each other on an outer circumferential side of the measurement conduit, wherein the measurement conduit is formed integrally from a resin material, one end portion and another end portion thereof along an axial direction, which are connected to the upstream side port and the downstream side port, are formed with true circular shapes in cross section, an intermediate portion thereof between the one end portion and the other end portion is formed with an oval shape in cross section, the coils are arranged in confronting relation to cross-sectional straight line portions formed on an outer circumferential surface of the intermediate portion, and the electrodes are arranged perpendicularly with respect to the coils.

2. The electromagnetic flowmeter according to claim 1, wherein the coils are retained on a yoke formed with a U-shape in cross section, the measurement conduit being disposed in an interior of the yoke.

3. The electromagnetic flowmeter according to claim 1, wherein a cover member, which is mounted on the body and made from a metal material, is disposed at a position isolated from ground potential.

4. The electromagnetic flowmeter according to claim 1, wherein the intermediate portion is formed with an oval shape in cross section, which is elongated toward circuit boards disposed in the body.

5. The electromagnetic flowmeter according to claim 1, wherein the electrodes are disposed on an outer circumferential surface of the measurement conduit, with foam sheets being mounted thereon covering the electrodes.

6. The electromagnetic flowmeter according to claim 3, wherein the ground potential is constituted from a pair of attachments, which are disposed on opposite ends in the axial direction of the body, and the attachments include the upstream side port and the downstream side port respectively therein.

* * * * *